United States Patent [19]

Wurtz

[11] Patent Number: 4,651,459

[45] Date of Patent: Mar. 24, 1987

[54] AUTOMATIC FISHING DEVICE

[76] Inventor: Ruben M. Wurtz, P.O. Box 652, Black Hawk, S. Dak. 57718

[21] Appl. No.: 835,064

[22] Filed: Feb. 28, 1986

[51] Int. Cl.$^4$ .................... A01K 91/06; A01K 97/12
[52] U.S. Cl. ............................................ 43/15; 43/16
[58] Field of Search ...................................... 43/15, 16

[56] References Cited

U.S. PATENT DOCUMENTS 1,870,782  8/1932  Minatilli ................................. 43/16
3,621,599  11/1971  Uhlich .................................... 43/15

FOREIGN PATENT DOCUMENTS 2032741A  5/1980  United Kingdom .................... 43/15

Primary Examiner—Nicholas P. Godici
Assistant Examiner—Christopher L. McKee
Attorney, Agent, or Firm—Caesar, Rivise, Bernstein, Cohen & Pokotilow, Ltd.

[57] ABSTRACT

A fishing apparatus particularly adapted for ice fishing. Fishing line having a first stop member thereon is wound around a rotatable spool member. A winding mechanism is connected to the spool member for automatically rotating the spool and winding the fishing line therearound. A mounting assembly is connected to the winding mechanism and passes through the spool member for supporting both the winding mechanism and the spool member. The mounting assembly is connected to a platform when the apparatus is used for ice fishing. The platform has an opening therethrough and is designed to fit over a hole in the ice. An adjustable trip mechanism is positioned between the spool member and the platform and is engagable with the first stop member on the fishing line in order to restrain the stop member from moving toward the spool member and to halt the rotating motion imparted to the spool by the winding mechanism while the stop member is restrained. A second stop member is positioned on the fishing line spaced from the first stop member. A holding member is affixed to the platform and extends over the opening therein to receive and hold the second stop member thereon above the opening. A signal flag is also provided which engages the spool and flips up to indicate rotation of the spool when a fish strikes the line.

22 Claims, 12 Drawing Figures

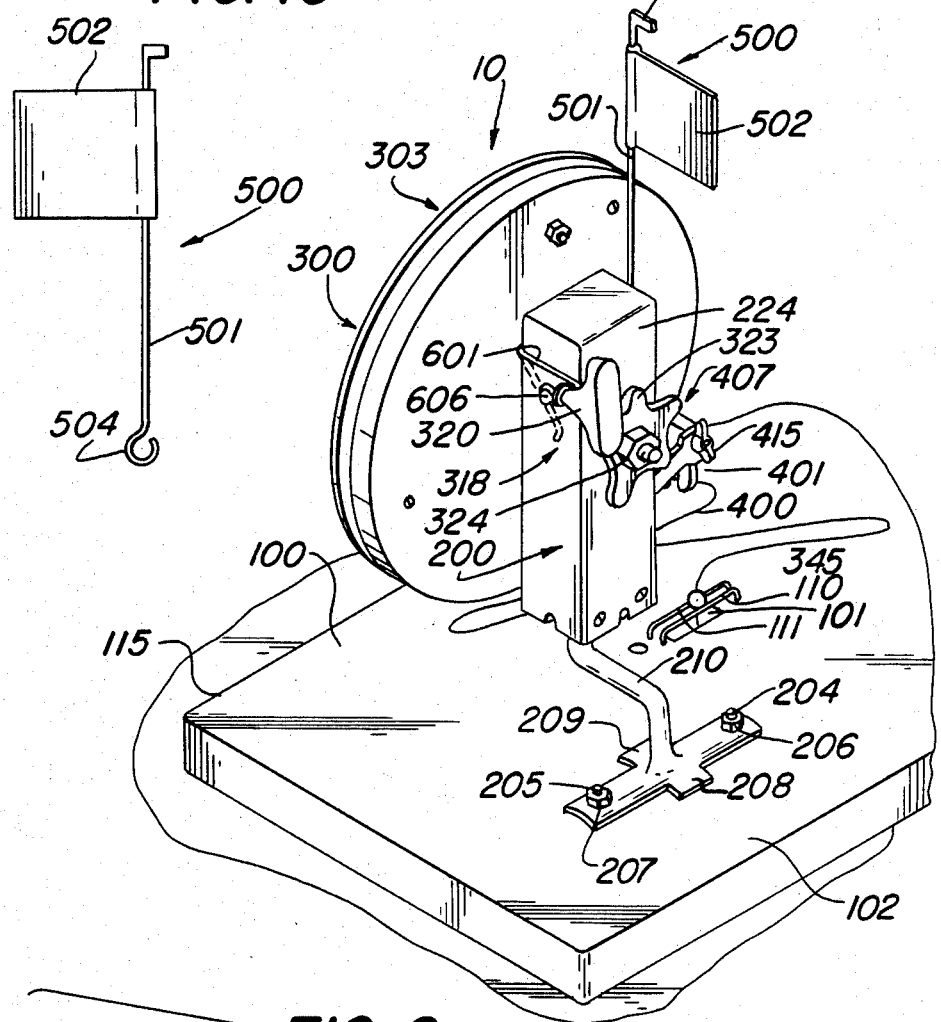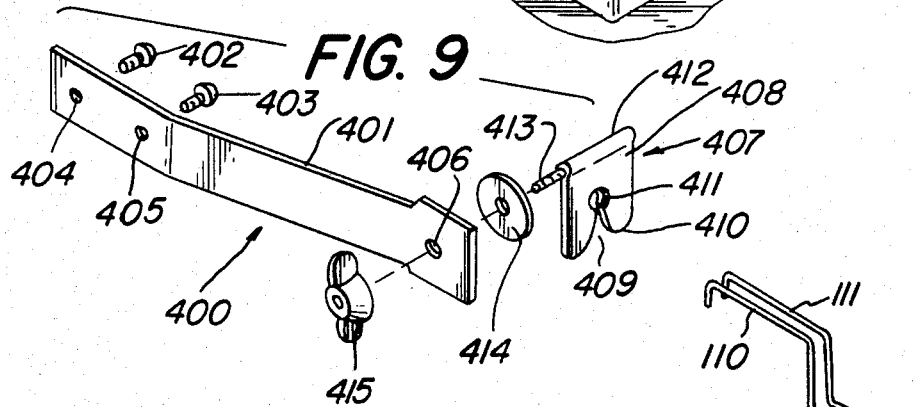

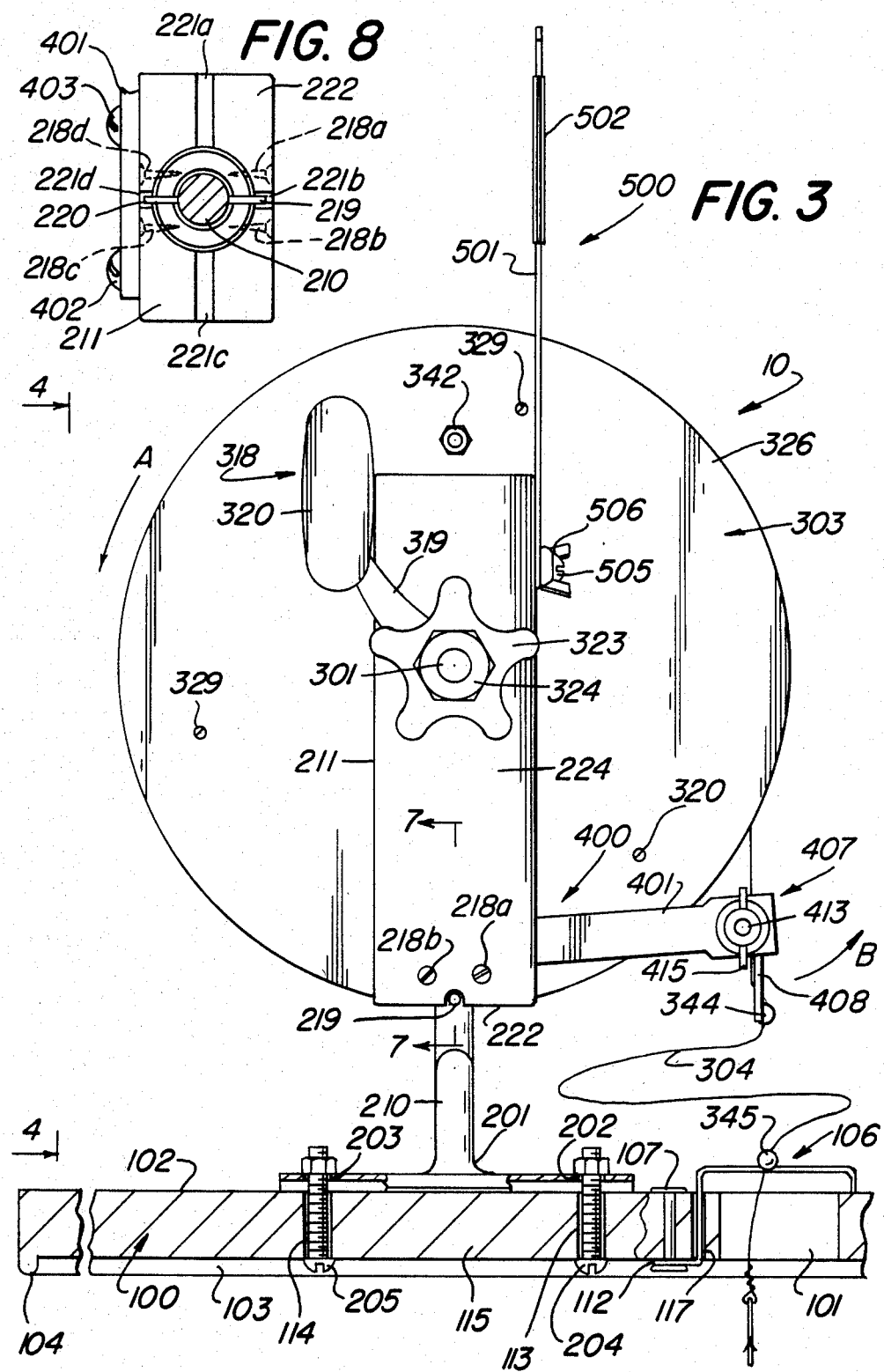

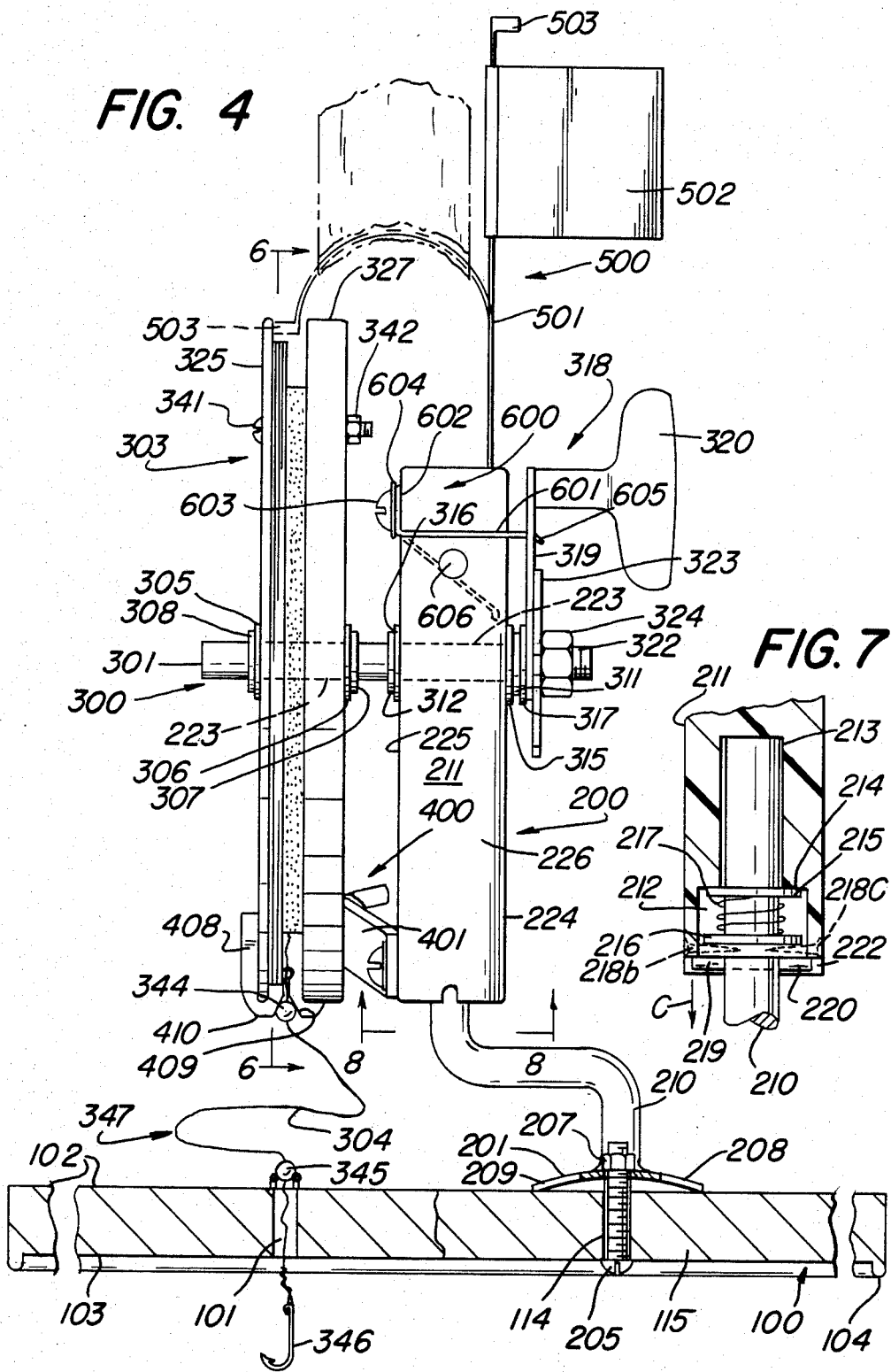

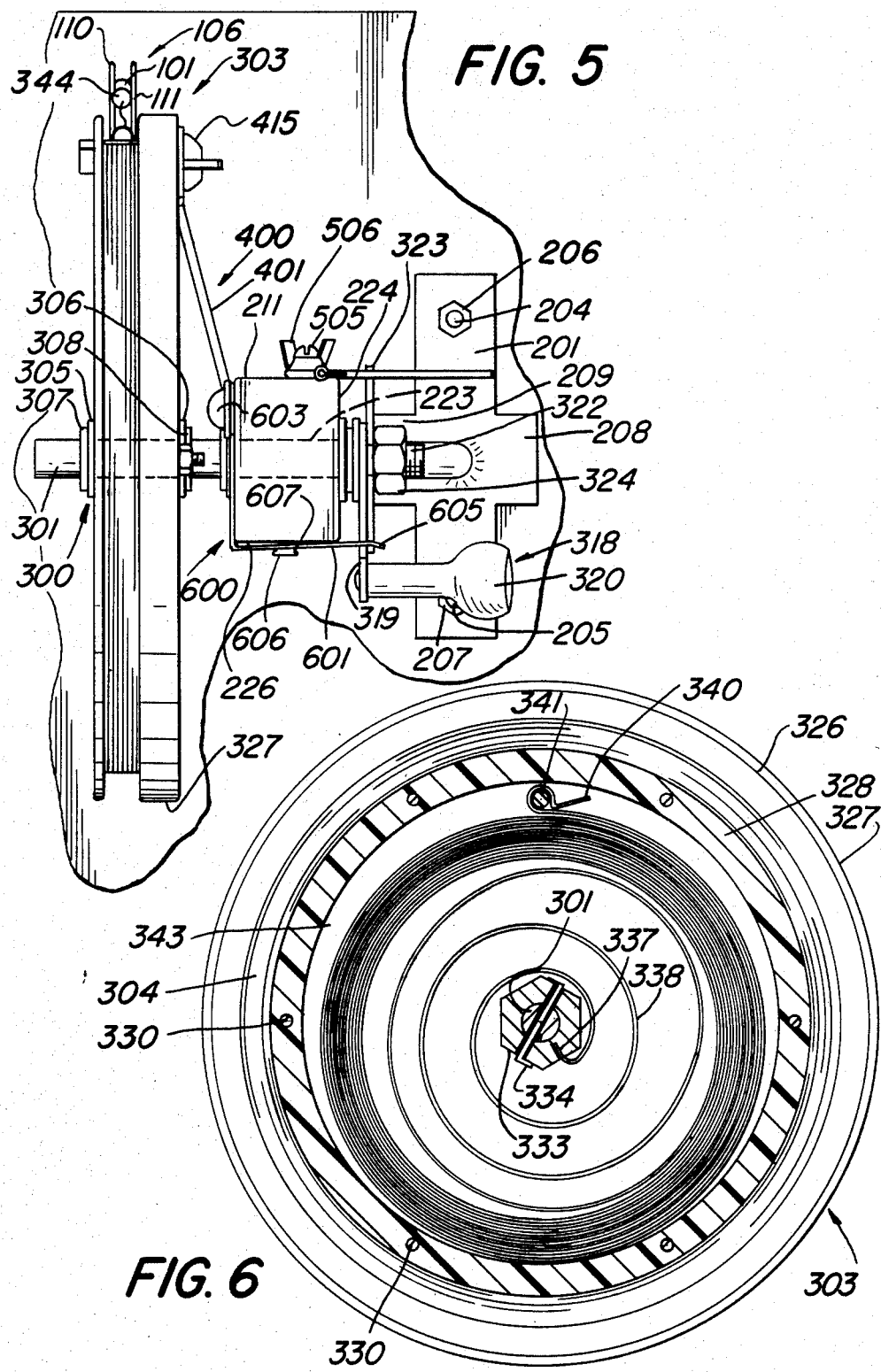

AUTOMATIC FISHING DEVICE

BACKGROUND OF THE INVENTION

The present invention relates to a fishing apparatus, and in particular relates to a fishing apparatus which can be adjusted to automatically set the hook in a fish and reel in the fish once the hook has been set. Moreover the invention relates to a device which is particularly suited for ice fishing.

Fishing during the summertime or in a comfortable climate year round can be an enjoyable pastime. During the winter, however, some of the thrill of fishing outdoors can be eclipsed by the severly cold weather. Still, ice fishing is extremely popular where lakes and ponds freeze over during the winter.

Rather than sit on a frozen lake all day (or all night) to be on hand while waiting for a fish to strike, it is beneficial to have a device which will automatically catch the fish while the fisherman is in some other warmer location.

Various devices are known which can be used to automatically set a fishing hook in a fish without the manual assistance of the fisherman. These setting devices usually rely on some resilient member being released or tripped to provide a jerking motion to the fishing line. Other devices have been developed to signal the fisherman when the fish strikes, and still further devices have been created to automatically reel in the fish once the fish takes the bait. While these various devices have confronted some of the major drawbacks associated with an automatic ice fishing device, e.g., setting of the hook, signalling the strike and reeling in the fish, there is still much room for improving the efficiency of operation of these devices and solving numerous other problems which still plague fishermen and ice fishermen in particular.

For example, when the fishing device is left unattended, the sensitivity of the tripping mechanism, the mechanism that releases the force which sets the hook in the fish, can be extremely important. Larger fish usually require a less sensitive tripping mechanism since they exert a strong force against the fishing line to easily release any tripping mechanism. Smaller fish, however, require a much more sensitive (or easily tripped) tripping mechanism. Therefore, a tripping mechanism permanently set to require a less sensitive tripping force that is acceptable for large fish is not always acceptable for use with smaller fish that may take the bait but are not strong enough to release the tripping mechanism and thus activate the mechanism which sets the hook. If, on the other hand, the tripping mechanism is much less sensitive, fish that are simply nibbling on the bait or simply playing with the bait can accidently trip the setting mechanism without ever actually taking the bait or the hook. The result is that large fish can get away by prematurely tripping the mechanism before the hook is ready to be set. Therefore, it is preferable that a tripping mechanism be provided which can be adjusted to different tripping strengths or sensitivities depending on the type or size of fish to be caught.

In ice fishing, it is also difficult to readily determine the appropriate depth for fishing since the line is usually simply played out from the reel through an opening in the ice. Each time the line is brought in, it therefore becomes necessary to determine how much line should be played out for the next fish to be caught. Accordingly, it would be beneficial if fishermen were able to accurately return the line each time to the proper depth where the fish appear to be biting, or at least to a proper depth off the bottom of the lake or pond.

A further problem relating to the tripping mechanism, in addition to the necessity to be able to vary the sensitivity of the tripping mechanism, is the timing of the tripping action. If the tripping mechanism is released too soon the setting mechanism may be activated before the fish has had sufficient time to completely take the bait and the hook will not be set when the setting mechanism is activated. Therefore, it is beneficial if the action of the tripping mechanism can be delayed and the fish allowed a few moments to run with and swallow the bait before the tripping mechanism is released and the setting mechanism acts to set the hook in the fish.

Of concern to many ice fishermen who leave their ice fishing devices unattended on open ice surfaces in subfreezing weather is the probability that blowing snow will fill in the ice hole or the ice hole will simply refreeze due to the cold temperatures. Accordingly, there is a need, especially if the device is to be left unattended, for a structure which can prevent the ice hole from filling with snow or refreezing.

OBJECTS OF THE INVENTION

With the above background in mind, it is a primary object of the present invention to provide an improved automatic fishing apparatus, and particularly an automatic apparatus for ice fishing which can set the hook in a fish and reel the fish in without manual assistance.

It is a further object of the invention to provide an automatic fishing apparatus that has an adjustable tripping mechanism which is readily and easily adjustable for different tripping forces exerted against the fishing line.

A still further object of the invention is to provide an automatic fishing apparatus which allows the fish to run with the line for a predetermined distance before the tripping mechanism is released and the setting mechanism engages and sets the hook in the fish.

Yet a further object of the invention is to provide an automatic fishing apparatus which easily allows the fishing line to be returned to a predetermined depth each time the line is returned to the water.

Another object of the invention is to provide an automatic fishing apparatus for ice fishing which prevents snow from accumulating in the hole through the ice and which further prohibits ice from reforming in the hole.

It is also an object of the invention to provide an automatic fishing apparatus which can be used with a fishing pole for open water fishing or mounted on a platform for ice fishing.

SUMMARY OF THE INVENTION

In furtherance of these objectives, a fishing device, and in particular an improved ice fishing device, is provided. The device has a platform which rests on the ice and has a narrow opening therethrough positioned over a hole cut through the ice. A mounting assembly extends upward from the platform and includes a swivel mounting block onto which is mounted a rotatable spring-wound spool containing fishing line. The spring in the spool is wound so that fishing line withdrawn from the spool can be automatically rewound around the spool. The fishing line has attached thereto a first stop member which is engageable with an adjustable tripping member attached to the mounting block. When the first stop member engages the tripping member, automatic rewinding of the fish line around the spool is prevented. Withdrawing the first stop member from engagement with the tripping member allows the automatic rewinding to begin. The start of the rewinding sets the hook in the fish, and the continued rewinding reels the fish in. A resilient signal flag member is attached to the mounting block and is adapted to contact the spool while it is stationary and to flip into a signalling position when the spool beings to rotate, as when the first stop member is removed from engaging the tripping member and automatic rewinding beings.

Resilient parallel holding wires are positioned above the narrow opening through the platform. These wires engage a second stop member affixed to the fishing line at a distance from the free end of the fishing line and spaced from the first stop member. When the second stop member reaches and rests on the top of the parallel wires the desired amount of fishing line has been lowered into the water. When a fish strikes, the fishing line is pulled downward through the opening in the platform; the second stop member is pulled through the holding wires; the line between the first and second stop members is pulled tight; the first stop member is pulled from engagement with the tripping member; and the spool begins to automatically rewind the fishing line, thereby setting the hook in the fish and reeling in the fish at the end of the line.

The mounting assembly can be removed from the platform and affixed to a fishing pole for open water fishing. Also, the mounting assembly can be attached by a hinge assembly onto the platform so that the mounting block can move between vertical and horizontal positions to facilitate transporting the device.

DESCRIPTION OF THE DAWINGS

Other objects and many of the attendant advantages of the instant invention will be readily appreciated as the same becomes better understood by reference to the following detailed description when considered in conjunction with the accompanying drawings wherein:

FIG. 1 is a perspective view of the automatic fishing device of the present invention;

FIG. 3 is a side elevational view of the fishing device of the present invention taken in the direction of arrows 3—3 in FIG. 2;

FIG. 4 is a front elevational view of the fishing device of the present invention taken in the direction of arrows 4—4 in FIG. 3;

FIG. 5 is a plan view of the fishing device of the present invention;

FIG. 6 is a sectional view of the fishing line spool of the present invention taken along the line 6—6 in FIG. 4;

FIG. 7 is an enlarged sectional view of the mounting block of the present invention taken along line 7—7 of FIG. 3 showing the swivel mechanism;

FIG. 8 is an enlarged sectional view of the mounting block of the present invention taken along line 8—8 of FIG. 4 showing the underneath side of the mounting block and the swivel mechanism;

FIG. 9 is an exploded perspective view of the tripping member of the fishing device of the present invention;

FIG. 10 is a side elevational view of the signal flag of the present invention;

FIG. 12 is a perspective view of the line holder of the present invention.

DETAILED DESCRIPTION OF THE PREFERRED EMBODIMENT

Figure 2:
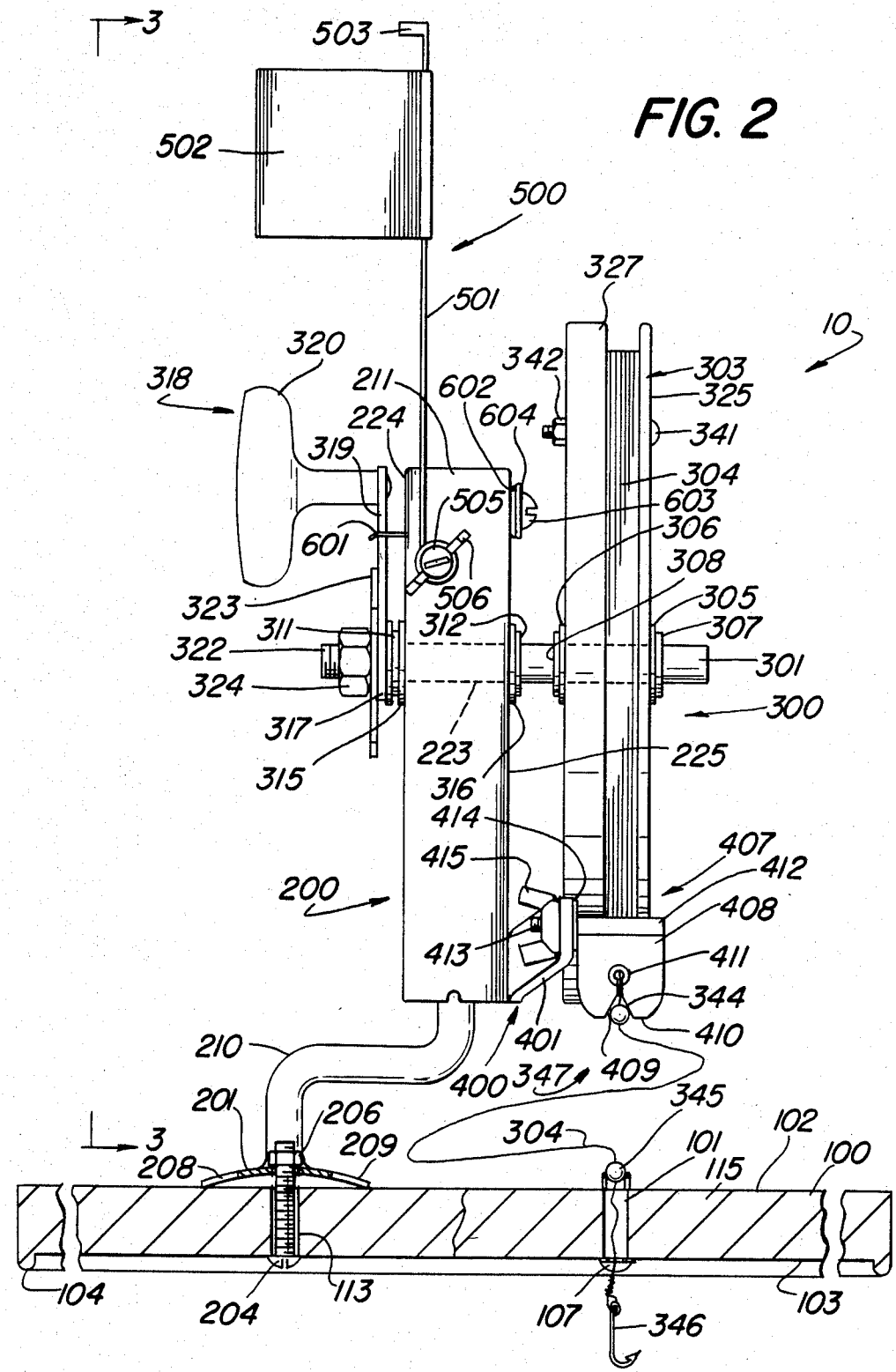
FIG. 2 is a front elevational view of the fishing device of the present invention.

Referring now in greater detail to the various figures of the drawings wherein like reference characters refer to like parts the automatic fishing apparatus of the present invention is generally shown at 10 in FIG. 2. The fishing apparatus 10 comprises, generally, a hole cover 100, a mounting assembly 200, a reel assembly 300 mounted on the mounting assembly 200, a tripping mechanism 400 attached to the mounting assembly 200 and a signal flag 500 attached to the mounting assembly 200.

As shown in FIGS. 1-5, the hole cover 100 includes a base or platform 115 that is designed to be placed over a hole cut or bored through the ice on a pond or lake or other frozen fishing area. (The hole, of course, must be large enough to remove a fish therethrough and smaller than the platform 115.) While the platform 115 is shown to be square in shape, the platform 115 may also be circular. The square shape is used with holes in ice that have been cut by chain saws and are not circular in shape. The platform 115 has a hole 101 therethrough which communicates between the top 102 and bottom 103 of the platform 115. The hole 101 as shown in FIGS. 1 and 5 is oblong or elongated in shape and is positioned in the center of the platform. In the preferred embodiment the hole is ⅜ of an inch long and ¼ of an inch wide. This shape of the hole 101 allows for some movement of the fishing line 304 within the hole, but is small enough to substantially prohibit cold air and blowing snow on the outside of the platform 115 from getting beneath the platform. Also shown in FIG. 2, the platform 115 has a lip 104 around the bottom edge thereof. This lip 104 supports the bottom side 103 of the cover plate slightly above the surface of the ice and helps to prevent the apparatus 10 from being blown across the ice by winter winds which would otherwise blow a platform with a flat bottom surface 103 around on the ice.

Connected to the platform 115 and extending over the hole 101 is a line holder designated generally as 106. As best shown in FIGS. 3, 5, and 12, the line holder 106 is comprised of a resilient bent wire member having two side wires 110, 111 joined by a curved wire portion 112. The side wires 110, 111 extend across the length of the hole 101 and downward through two holes 116, 117 in the platform 115. The curved wire portion 112 is held against the underside 103 of the platform 115 between the platform and a rivet 107 through the platform. The use and application of the line holder will be explained more fully later herein.

The platform 115 is preferably formed from metal sheet material, such as 22 gauge steel, or a plastic material, and the lip 104 is formed by bending the edge of the sheet material downward. The use of metal sheet material has been found to be very beneficial in preventing the ice hole underneath the metal platform 115 from refreezing. It is theorized that the metal is easily heated by sunlight during the day, which prevents refreezing during daylight hours. Furthermore, the metal is believed to retain heat within the ice hole, from both the warmer water under the ice and any heat created by sunlight on the metal.

Connected to the platform 115 is the mounting assembly 200. (FIGS. 2-5.) The mounting assembly 200 has a base member 201 with two holes 202, 203 therethrough. These holes are aligned with two holes 113, 114 in the platform 115. Bolts 204, 205 pass upward through the holes 113, 114 in the platform 115 and extend through the holes 202, 203 in the base member 201. Nuts 206, 207 are tightened respectively on to bolts 204, 205 in order to hold the base member securely against the platform 115. Along the length of the base member 201 are two stabilizer wings 208, 209 which extend outward from the base member. These wings help to stabilize any side-to-side motion. The base member 201 is slightly convex and curved in the longitudinal direction, so that the base member may also be attached to a fishing pole in the usual manner as will be discussed later herein.

Extending upward from the base member 201 is a mounting rod 210. As shown in FIGS. 7 and 8, the mounting rod 210 fits into a mounting block 211 in such a manner that the mounting block 211 can swivel about the mounting rod. The mounting block 211 has two bores therein which receive the mounting rod 210. The first bore 212 is larger in diameter than the second bore 213 which is only slightly larger that the diameter of the mounting rod 210. A shoulder 214 is formed at the junction of the first and second bores. The bores 212, 213 are concentrically aligned.

As shown in FIG. 7, the mounting rod 210 extends through the first and second bores, and surrounding the mounting rod 210 within the first bore 212 are first and second washers 215, 216. The upper washer 215 is affixed to the rod. Positioned between the first and second washers is a helical compression spring 217 which forces the first and second washers apart. The lower washer 216 is held within the first bore 212 by four screws 218a-d (FIG. 8) which extend through the side walls of the mounting block 210 into the first bore 212.

The mounting rod 210 has extending therefrom two ears 219, 220. These ears 219, 220 are diametrically opposed to each other and are designed to be positioned within grooves 221a-d (FIG. 8) formed in the bottom or underside 222 of the mounting block 211.

While the entire mounting assembly can be formed of metal, the mounting block 211 is preferably formed from any plastic material, such as polypropylene, that is not harmed by cold weather.

The reel assembly 300 is mounted onto the mounting block 211 by means of a support rod 301 which passes through a hole 223 in the mounting block 211. The mechanism of the reel assembly is best shown in FIGS. 2, 4 and 5. A spool generally indicated as 303 is axially mounted on and rotatable about the support rod 301. The construction of the spool is shown in FIG. 6. Fishing line 304 is wound around the spool 303.

With reference to FIGS. 2, 4 and 5, on each side of the spool 303 are washers 305, 306 and adjacent the washers 305, 306 are lock washers 307, 308, respectively. The first lock washer 307 fits within a groove around the support rod 301 and the second lock washer 308 fits within a second groove around the circumference of the support rod 301.

The support rod 301, as it passes through the hole 223, in the mounting block 211, is held in position within the block by lock washers 311, 312 held within respective grooves in the support rod 301 on each side of the mounting block 211. Between the lock washers 311, 312 and the side walls 224, 225 of the mounting block are washers 315, 316 surrounding the support rod 301, the first washer 315 being positioned between the side wall 224 and the lock washer 311, and the second washer 316 being positioned between the side wall 225 and the second lock washer 312.

Adjacent the lock washer 311 on the support rod 301 is a third washer 317 which separates the lock washer from a handle member 318. The handle member has a handle arm 319 to which is attached a knob 320 at one end. The end of the handle are 319 opposite the knob 320 contains a hole which fits around the support rod 301.

The support rod 301 is metal and smooth surfaced, except for the grooves for the lock washers and threading 322 around the end of the support rod 301 opposite the end around which the spool 303 is positioned. Threaded on to the threads 322 is a star drag disc 323. Threaded on to the threads 322 adjacent the star drag is a nut 324 which tightens against the star drag disc 323.

Also mounted on the mounting block is the handle restraint 600. (FIGS. 2, 4 and 5.) The handle restraint 600 is a wire member 601 which has a loop 602 at one end thereof. A screw 603 passes through the loop 602 and secures the wire member 601 to the mounting block 211. A washer 604 is fitted around the screw 603 and is positioned between the underside of the head of the screw 603 and the loop 602. The end 605 of the wire member opposite the loop 602 is slightly bent (FIG. 5) in order to retain the handle arm 319 when the wire member 601 extends horizontally across the side wall 226 of the mounting block 211 into the path of the handle arm 319. Also mounted on the side wall 226 of the mounting block 211 is a wire restraint 606. In the preferred embodiment, the wire restraint is a screw screwed into the mounting block with the underside 607 of the head of the screw spaced slightly from the side wall 226 of the mounting block 211. As shown by the phanton lines in FIG. 4, the wire member 601 can be forced downward under the screw 606 so that the wire member 601 does not project into the path of the handle arm 319.

As further shown in FIGS. 2, 4 and 5, the tripping mechanism 400 is connected to the side wall 225 of the mounting block 211 at the lower edge thereof. The tripping mechanism (FIG. 9) includes a tripping arm 401 which is screwed onto the mounting block by two screws 402, 403 which pass through holes 404, 405 respectively in the tripping arm 401. Mounted through a hole 406 at the end of the tripping arm opposite holes 404, 405 directly over the hole 101 in the platform 115 is a tripping member 407. The tripping member 407 includes a tripping plate 408 with a cutout groove 409 through the bottom edge 410 thereof which extends upwardly toward the center of the tripping plate. At the top of the groove 409 is a circular cup or depression 411. Extending from the top edge 412 of the tripping plate is a threaded arm 413 which passes through the hole 406 in the end of the tripping arm 401. A washer 414 fits around the threaded arm 413 and is positioned between the tripping arm 401 and the tripping plate 408. A wing nut 415 is threaded onto the arm 413 to hold the tripping member 407 on the tripping arm 401.

The threaded arm 413 is free to rotate within the hole 406 until the wing nut 415 securely tightens the washer 414 and the tripping plate 408 against the tripping arm 401. When the tripping plate is loose, however, it can rotate and be positioned in any position and held in that position by tightening the wing nut 415. The use of the tripping mechanism will be more fully explained later in this description.

The mounting block 211 has further attached thereto the signal flag mechanism 500. (FIGS. 2–4 and 10.) The flag mechanism includes a flag arm 501 of flexible wire. A flag member 502 is affixed to the flag arm 501 and the flag arm further has an angled bent portion 503 at the end thereof adjacent said flag member. The end of said flag arm 501 opposite said angled bent portion 503 is formed with a loop 504. The loop 504 surrounds a screw 505 inserted into the mounting block 211 and the loop 504 is held tightly against the mounting block 211 by a wing nut 506, threaded onto the screw 505 and tightened toward the mounting block 211 with the loop 504 between the wing nut 506 and the mounting block 211. As shown in phantom in FIG. 4, the flag arm 501 is of a length sufficient to allow the arm to be bent so that the angled bent portion 503 thereof can frictionally engage the spool member 303 due to the resilient force of the bent flag arm 501. The flag member 502 can be affixed to the wire in any known manner, including forming the flag member from a piece of overlapped tape.

The spool member 303 of the present invention which holds the fishing line 304 is best shown in FIG. 6. The spool member 303 shown in FIG. 6 is a cross-sectional view taken along line 6—6 in FIG. 4. In this view, the spool member 303 is shown with the outer spool disk 325 removed therefrom. The spool member 303 is comprised of an inner circular spool disk 326 which has a cover member 327 affixed thereto that extends partially over the space between the inner and outer spool disks 326, 325, respectively. Connected to the inner and outer spool disks is a hollow cylindrical core member 328. The core member 328 may be either glued to the disks or, as shown in FIG. 6 and FIG. 3, the core member 328 can be screwed by means of screws 329 through the inner disc 326 extending into the core member and by means of screws 330 extending through the outer spool disk 325 into the core member 328. Fishing line 304 is wound around the cylindrical core member 328.

The inner spool disk 326 has a cylindrical opening or hole therethrough and the outer spool disk 325 has a hole or opening therethrough so that the disks can fit onto the support rod 301. The holes in the disks are axially aligned. Positioned between the holes within the core member 328 is a base member 333 with a hole therethrough aligned with the holes in the disks. The support rod 301 passes through the hole in the base member 333. The base member 333 is secured to the support rod 301, and in the preferred embodiment, the base member 333 has a pin member 334 which extends through the base member and the support rod, thereby affixing the base member to the support rod. The pin member 334 is bent at an angle at each end so that the pin member will not come out of engagement with the base member and the support rod.

The base member 333 further has a slot 337 therein which receives the first end of a helical metal winding strip 338 which, as will be explained, provides the winding movement, for automatically rotating the spool 303 and winding the fishing line 304 around the core member 328. The metal strip 338 is helically wound around the inside of the core member 328. The second end 340 of the metal strip is securely held between the outer and inner spool disks 325, 326. The securing of the second end 340 of the metal strip 338, in the preferred embodiment, is achieved by bending the end 340 around a bolt 341 which extends between the outer and inner spool disks 325, 326 and which is held in position by a nut 342. In this manner, each end of the metal strip 338 is securely fixed within the hollow space 343 inside the core member 328. As shown in FIG. 6, the metal strip 338 is wound clockwise from the end 340 around the support rod 301 to the end 339 which is inserted into the slot 337 of the base member 333. The metal strip 338 is any resilient metal material and has a length, preferably, of at least one-third the length of the fishing line wound around the core member 328.

The fishing line 304, as shown in FIGS. 2, 3 and 5, also has affixed thereto two spaced stop members 344, 345. As shown in FIG. 2, the first-shot member 344 is provided to contact the tripping plate 408 and the second stop member 345 rests on the line holder 106. A more complete explanation of the functions of the two stop members will be provided later in this description.

It is, of course, the primary purpose of the present invention to provide an ice fishing device which can be left unattended on the ice and which will automatically set the hook in a fish when it has taken the bait on the hook, as well as automatically reel in the fish once the hook has been set. Having in mind the various operating parts of the invention as previously described, an understanding of the operation of the apparatus can be readily understood from the following description.

The use of the automatic fishing apparatus 10 and the present invention for ice fishing pre-supposes that a hole has been forced or cut through the ice in any known manner. The platform 115 with the mounting assembly 200, the reel assembly 300, the tripping mechanism 400, the signal flag mechanism 500 and the handle restraint 600 is position over the hole in the ice such that when the fishing line 304 extends downward through the hole 101 in the platform 115, it passes substantially through the center of the hole in the ice. By so positioning the platform, the line 304 is less likely to become frozen to the side of the ice hole. The positioning of the elongated hole 101 over the center of the ice hole is faciliated by the positioning of the hole 101 in the center of the platform 115.

Once the platform 115 is in position over the hole in the ice, a hook 346 (and any desired weight) is placed on the end of the fishing line 304 and the hook and line passed through the hole 101 in the platform 115. Fishing line 304 is manually removed from the spool member 303 by pulling the line 304 away from the core member 328 until the hook 346 reaches the desired depth. When the desired depth is attained, the second stop member 345 is clamped to the fishing line and the stop member 345 is allowed to rest on the two side wires 110, 111 of the line holder 106. The first stop member 344 is placed on the line 304 at a distance along the line 304 from the second stop member 345. The stop members are preferably made of split lead-shot and are simply squeezed onto the fishing line at the split in the shot.

Next, while holding the spool member 303 stationery in one hand, with the wire member 601 moved from the path of the handle arm 319 and positioned under the wire restraint 606, the handle member 318 is rotated counterclockwise to tighten the metal winding strip 338 inside the spool member 303. After the winding strip 338 has been tightened or coiled the desired amount, the wire member 601 of the handle restraint 600 is positioned to prevent the handle member 318 from rotating in the clockwise direction and thus allowing the metal winding strip 338 to unwind. While still preventing the spool member 303 from rotating, the first stop member 344 is positioned in the groove 409 of the tripping member 407. After the first stop member 344 is positioned in the groove 409, the spool member 303 can be released and the first stop 344 will be constrained within the groove 409 due to the force of the winding strip 338 urging the spool to rotate and wind or pull the line and stop member toward and around the core member. However, the presence of the groove 409 in the tripping plate 408 prevents the first stop member 344 and the line from passing thereby, thus preventing the spool member 303 from rotating under the urging of the winding strip 338 and winding the fish line 304 onto the core member 328.

After the wire member 601 is positioned to engage the handle member 318 and the first stop member 344 is positioned in the groove 409, the flag arm 501 is bent over as shown in FIG. 4 so that the angled bent portion 503 at the end of the flag arm 501 forces against the outer spool disk 325 above the level of the fishing line 304 around the core member 328. The angled bent portion 503 forces against the outer spool disk 325 due to the resiliency of the flag arm attempting return to its upright position. Thereafter when the outer spool disk begins to rotate, e.g., when the line 304 is being pulled out by a fish after it strikes the bait and begins to run with the hook, the rotation of the outer spool disk 325 causes the angle bent portion 503 to disengage from the outer spool disk and spring back to its vertical position, thus signalling that a fish has been caught.

One of the significant improvements of the present invention is the use and positioning of the first and second stop members 344, 345 on the fishing line. The second stop 345 acts as a depth finder. By applying the second stop 345 to the line 304 just above the line holder 106 after the line has been let out to desired depth, the line 304 can continuously be returned to that depth no matter how many times it is reeled in since the second stop 345 will come to rest on the line holder 106. It is also significant that any desired amount of fish line 304 can be left between the positions of the two stops 344, 345. The benefit of this slack line 347 between the two stop members will be discussed shortly.

After the flag arm 501 is set against the outer spool disk 325, the apparatus 10 is ready to be left unattended to catch fish. When a fish takes the baited hook and begins to run with the hook 346, the second stop 345 is pulled through the resilient sidewires 110, 111 of the line holder 106 on which it is resting and the slack between the two stops 344, 345 is taken up by the fish as it runs with the hook. When all of the slack 347 is drawn tight the first stop member 344 is pulled downward from its position in the groove 409 of the tripping plate 408. As soon as the first stop member 344 is moved out of engagement with the groove, the helically wound metal winding strip 338 causes the spool member 303 to rotate in a counterclockwise direction (Arrow A, FIG. 3) and thus begin to reel in the line 304. As soon as the spool member begins to rewind the line, the sudden jerk on the line sets the hook in the fish's mouth. From that point on, the fish will be fighting against the tension of the helically wound winding strip 338 which is attempting to rewind the line 304. Any pulling force exerted by the fish against the line 304 only serves to tighten the helical coil of the metal winding strip 338 so that when the fish ceases to exert any pressure against the line, the spool member 303 will again rotate counterclockwise and draw the fish toward the platform 115. Once the fish is worn out, it is reeled in by the automatic winding of the spool member and is bought into contact with the underside of the platform 115.

The fisherman knows that a fish has be caught since the movement of the spool member released the flag arm 501 from its engagement with the other spool disk 325. To remove the fish, the fisherman simply grabs the mounting assembly 200 and lifts the entire apparatus up and away from the hole in the ice. The fish is then removed from the hook.

After the fish has been removed, the apparatus 10 is again positioned over the hole in the ice; the baited hook is forced through the elongated hole 101; and the hook and line are allowed to drop until the second stop member 345 comes to rest on the line holder 106, thus signalling that the line has reached the desired depth. Thereafter, the procedure for tightening the winding member and setting the tripping member and the signal flag are as previously described.

As discussed earlier, one of the unique features of the present invention is the slack line 347 between the first stop member 344 in contact with the tripping plate 408 and the second stop member 345 resting on the line holder 106. By providing this slack line, when the fish takes the hook and pulls the second stop member 345 through the line holder 106, the force exerted by the fish does not immediately release the first stop member 344 from the tripping mechanism; rather, the fish is allowed to take the line for a distance before the first stop member 344 is pulled from the groove 409, the spool 303 begins to rotate and the hook is set. One of the important benefits of a line which allows the fish to run with the hook is to prevent the fish from becoming spooked by the quick jerking of the line possibly before the hook is in a position to be set and to prevent the signal flag 500 from springing up abruptly when the fish first begins to take the hook, which will also spook the fish.

Further benefits of the present invention include the ability to adjust the tripping mechanism 400 according to the size of fish being caught. Because the tripping member 407 is mounted for swivel movement on the tripping arm 401, it is possible to vary the angle of inclination of the tripping member 407. When the tripping plate 408 is tilted upward in the direction of Arrow B in FIG. 3, more force must be applied to the line 406 to cause it to be pulled from the groove 409 and thus release the tension which prevents the winding strip 338 from unwinding (and turning the spool 303 counterclockwise). When the tripping plate 408 is adjusted in a more vertical position, far less force must be exerted against the line to cause the first stop member 344 to be withdrawn from the groove 409 in the tripping plate 408.

The ability to be able to adjust the tripping force is important when fishing for different types of fish. When fishing for larger fish the tripping plate can be swiveled upward so that more tension on the line will be required to withdraw the first, stop member 344 from the groove 409 and release the spool member. When smaller fish are to be caught, the tripping plate can be adjusted more vertically so that less tension or force on the line 304 is required to remove the first stop member 344 from the groove 409. This adjustability is particularly important when fishing for large fish since large fish playing with the bait or simply nibbling on the bait might create enough tension to cause the first stop 344 to withdraw from the groove even before the fish has taken the bait if the tripping tension is set for light tension. Accordingly, with the adjustable tripping mechanism of the present invention, the apparatus can be easily set for light tripping force or heavy tripping force depending on the size of fish being sought.

The tripping plate 408 is also provided with the cup or depression 411 into which the first stop member 344 can be positioned. When the stop member 344 is in the cup it cannot be easily removed from the tripping plate. This is important when it is desired to lift the apparatus to check the hole underneath or to check the bait on the line and it is not desired to reel the line in. By moving the first stop 344 into the cup 411, the stop member cannot be accidentally released from the tripping plate and the winding strip 338 released.

The reel assembly is further provided with the threaded star drag 323 and nut 324 to prevent the spool member from "freezing" if a fish should take the hook and run with it beyond the capacity of the winding strip 338 to be tightened. By adjusting the pressure against the handle arm 319 by tightening the star drag 323 thereagainst, even though the handle arm 319 is restrained from movement by the wire restraining member 601, the support rod 301 can be allowed to rotate so that more line can be played off the spool as the fish pulls the line. As soon as the fish relaxes, the tightly wound winding strip 338 immediately begins to unwind and cause the spool to rotate and rewind the fish line 304. The threaded nut member 324 is tightened against the star drag 323 to keep the star drag snugly against the handle arm and prevent the star drag from coming off the support rod 301.

When low strength line 304 is being used, the drag tension can be made lighter by not tightening the star drag 323 as tightly against the support arm 319 so that the rod and spool attached thereto will rotate and release more line when less pull is exerted against the line to prevent the line from breaking. For stronger line, the drag tension should be increased since the line is less likely to be broken by the fish pulling against the line after the winding member 338 is completely wound, but before the support rod 301 begins to rotate.

While the mounting assembly 200 is specifically shown attached to the platform 115 for ice fishing, it is also possible to attach the mounting assembly 200 to a fishing pole for regular open water fishing. To do so, the bolts 204, 205 and nuts 206, 207 are removed to release the base member 201 from the platform 115. Because the base member 201 is slightly convex in configuration, it can easily fitted onto a fishing pole in the same manner as other fishing reels. In order to cast the line from the spool member 303 once the apparatus is connected to a fishing pole, the mounting block 211 must be rotated 90 degrees so that the fishing line can be easily removed from the spool member 303 over the outer spool disk 325. As shown in FIGS. 7 and 8, the mounting block 211 can be easily rotated by pulling downward on the mounting rod 210 to release the ears 219, 220 from the first set of grooves 221d and 221b. The mounting block can then be rotated 90 degrees so that the ears 219, 220 are positioned in the second set of grooves 221a, 221c. When the mounting rod 210 is pulled downward in the direction of Arrow C in FIG. 7, the spring 217 is compressed between the washers 215, 216 surrounding the mounting rod 210 in the first bore 212. After the ears 219, 220 are rotated between the first set of grooves 221d, 221b to the second set of grooves 221a, 221c and the downward force against the mounting rod 210 is released, the biasing force of the spring 217 against the washer 215 urges the mounting rod upward and forces the ears 219, 220 into the second set of grooves 221a, 221c.

After the line 304 has been cast in the usual manner of using a fishing pole, the spool member assembly is returned to a position aligned with the fishing pole by simply repositioning the ears 219, 220 back to their original location in the mounting block 211 inside the first set of grooves 221d, 221b. Thereafter, the tripping mechanism 400 can be set with the first stop member 344 in the same manner that it is set for use with ice fishing. There is no need for the second step member 345 since there is no line holder 106 on the fishing pole to support the second stop member 345.

Figure 11:
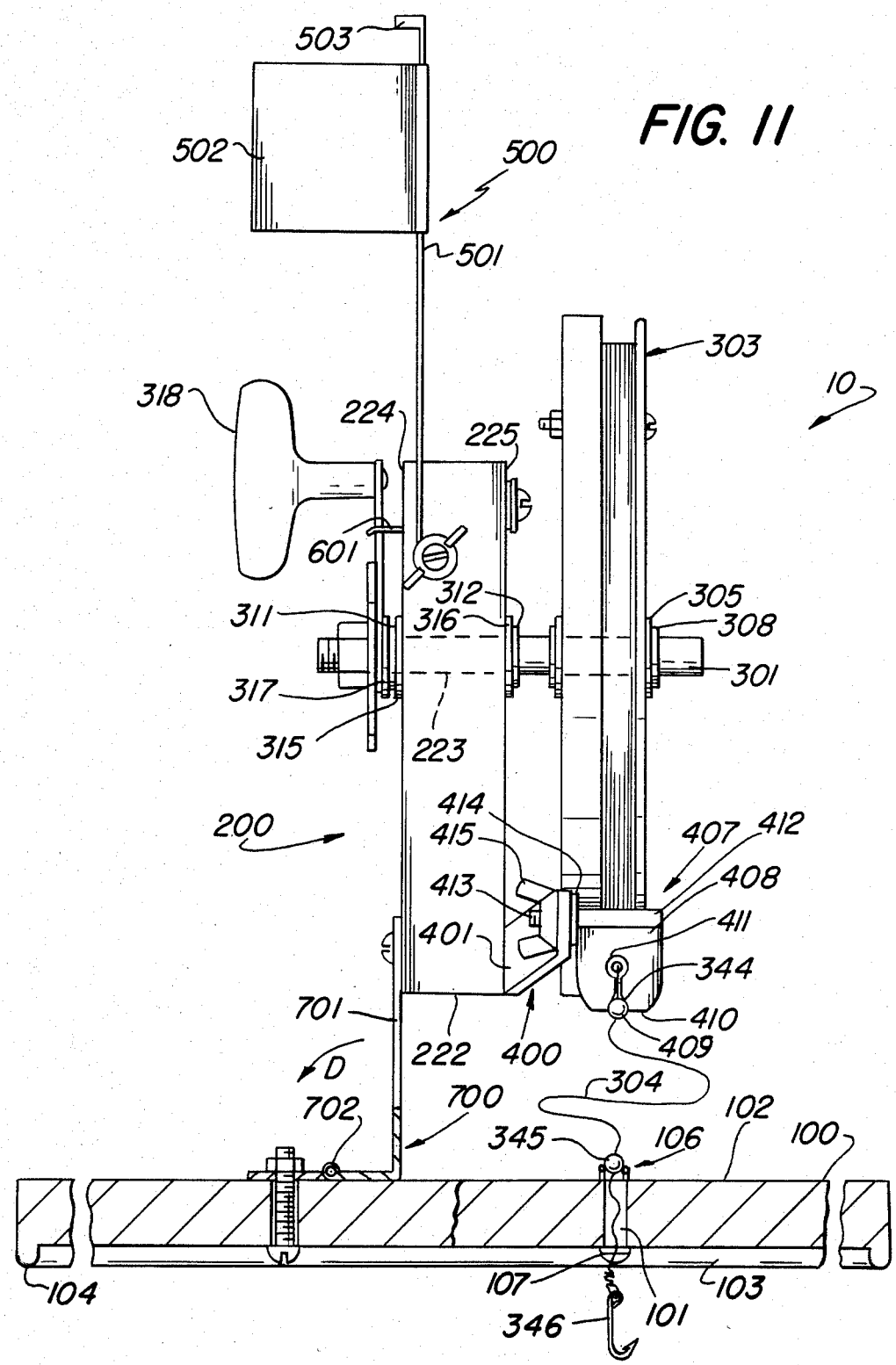
FIG. 11 is a front elevational view of the fishing device of the present invention showing an alternate hinged mounting assembly.

An alternative embodiment of the mounting assembly is generally shown at 700 in FIG. 11. Rather than provide a mounting rod 210 upon which the mounting block may be swivelly mounted, in the embodiment of FIG. 11, the mounting block 211 is affixed to an angled support member 701 which is connected by a hinge 702 to a support base 703 affixed to the platform 115. The support base 703 may be bolted or pop-riveted to the base and the angled support member 701 may be affixed to the mounting block 211 by a screw 704 or any other suitable means.

By providing this hinged angle-arm construction, the mounting block 211 and reel assembly can be folded downward at the hinge 702 (Arrow D, FIG. 11) to facilitate transportating the entire apparatus. To set up or take down the apparatus is then just be a matter of pivoting the mounting block upward or downward about the hinge 702.

Without further elaboration, the foregoing will so fully illustrate my invention that others may, by applying current or future knowledge, readily adopt the same for use under various conditions of service.

What is claimed is:

1. An apparatus for fishing through a hole in ice, said apparatus comprising:
    a fishing line;
    a first stop member on said fishing line;
    rotatable spool means for holding said fishing line therearound;
    winding means connected to said spool means for automatically rotating said spool means and winding said fishing line therearound;
    mounting means connected to said winding means for supporting said winding means and said spool means;
    platform means for fitting over said hole in said ice, said platform means being connected to said mounting means and having a first opening therethrough; and
    trip means between said spool means and said platform means and engagable with said first stop member on said fishing line for restraining said first stop member from moving toward said spool means and halting the rotating motion imparted to said spool means by said winding means while said first stop member is restrained, said trip means being adjustable so as to allow release of said first stop member upon line pulls of varying magnitude.

2. A fishing apparatus as claimed in claim 1, further comprising:
    a second stop member on said fishing line spaced from said first stop member; and holding means on said platform means for supporting said stop member.

3. A fishing apparatus as claimed in claim 2, wherein said holding means is a resilient wire member connected to said platform means and extending over said first opening in said platform means.

4. A fishing apparatus as claimed in claim 3, wherein:
said platform means has two holes adjacent said first opening through said platform means;
said wire member passes through said two holes and extends across said first opening as two spaced side wires; and
said holding means further comprises means for connecting said wire member to said platform means.

5. A fishing apparatus as claimed in claim 2, wherein said second stop member is spaced from said first stop member by a distance greater than the distance between said trip means and said first opening in said platform means.

6. A fishing apparatus as claimed in claim 1, wherein said platform means is comprised of:
a plate member having said first opening therethrough; and
a lip extending downward from the underside of said plate member around the circumference thereof.

7. A fishing apparatus as claimed in claim 6, wherein said plate member is metal.

8. A fishing apparatus as claimed in claim 6, wherein said plate member is a plastic material.

9. A fishing apparatus as claimed in claim 1 further comprising signalling means connected to said mounting means and engagable with said spool means for signalling rotation of said spool means.

10. A fishing apparatus as claimed in claim 9, wherein said signal means is comprised of:
a flexible wire member connected to said mounting means; and
a flag member affixed to said wire member.

11. A fishing apparatus as claimed in claim 10, wherein said wire member is bent at the end thereof opposite the end connected to said mounting means, said bent end being frictionally engagable with said spool means.

12. A fishing apparatus as claimed in claim 1, wherein said mounting means is comprised of:
a mounting member connected to and projecting above said platform means;
a mounting block positioned on said mounting rod;
support means rotatably mounted on said mounting block for supporting said spool means thereon, said support means being connected to said winding means; and
handle means connected to said support means for manually rotating said support means.

13. A fishing apparatus as claimed in claim 12 further comprising handle restraint means affixed to said mounting block for restraining the movement of said handle means.

14. A fishing apparatus as claimed in claim 13, wherein said handle restraint means comprises:
a restraint member mounted on said mounting block and extendable into the path of rotation of said handle means; and
restraint holding means connected to said mounting block adjacent said restraint member for holding said restraint member out of the path of rotation of said handle means.

15. A fishing apparatus as claimed in claim 12, wherein:
said support means is comprised of a support rod rotatably mounted through said mounting block;
said spool means is rotatably mounted on said support rod; and
said winding means is connected to said support rod.

16. A fishing apparatus as claimed in claim 15, further comprising drag means affixed to said support rod for controlling the amount of force necessary to cause said support rod to rotate when said spool means is no longer able to rotate about said support rod.

17. A fishing apparatus as claimed in claim 12, wherein said mounting block is swivelly mounted on said mounting rod.

18. A fishing apparatus as claimed in claim 12, wherein:
said mounting member comprises a base connected to said platform means, and a support member connected to said mounting block, said support member being connected by a hinge to said base.

19. A fishing apparatus as claimed in claim 1, wherein said trip means is comprised of:
a tripping arm connected at one end to and extending away from said mounting means; and
a trip member adjustably swivelly mounted on said tripping arm and engagable with said first stop member.

20. A fishing apparatus as claimed in claim 19, wherein
said trip arm has a hole at the end thereof opposite the end connected to said mounting means; and
said trip member comprises:
a trip plate having a groove extending from the bottom edge toward the center thereof,
a mounting arm extending from said trip plate through said hole in said trip arm, said mounting arm being rotatable within said hole, and
means connected to said mounting arm for controlling the rotation of said arm in said hole.

21. A fishing apparatus as claimed in claim 19, wherein said trip plate further has a cup-like depression at the top of said groove.

22. An apparatus for fishing comprising:
a fishing line;
a first stop member on said fishing line;
rotatable spool means for holding said fishing line therearound;
winding means connected to said spool means for automatically rotating said spool means and winding said fishing line therearound;
mounting means connected to said winding means for supporting said winding means and said spool means; and
trip means adjacent said spool means and engagable with said first stop member on said fishing line for restraining said first stop member from moving toward said spool means and halting the rotating motion imparted to said spool means by said winding means while said first stop member is restrained, said trip means being adjustable so as to allow releases of said first stop member upon line pulls of varying magnitude.

* * * * *